United States Patent
Schall et al.

(10) Patent No.: US 10,660,161 B2
(45) Date of Patent: May 19, 2020

(54) TRANSPARENT PANE HAVING AN ELECTRICAL HEATING LAYER, METHOD FOR ITS PRODUCTION, AND ITS USE

(71) Applicant: SAINT-GOBAIN GLASS FRANCE, Courbevoie (FR)

(72) Inventors: Guenther Schall, Kreuzau (DE); Valentin Schulz, Niederzier (DE); Bojan Dimitrijevic, Bochum (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 379 days.

(21) Appl. No.: 15/500,025

(22) PCT Filed: Jun. 26, 2015

(86) PCT No.: PCT/EP2015/064482
§ 371 (c)(1),
(2) Date: Jan. 27, 2017

(87) PCT Pub. No.: WO2016/020114
PCT Pub. Date: Feb. 11, 2016

(65) Prior Publication Data
US 2017/0265254 A1    Sep. 14, 2017

(30) Foreign Application Priority Data
Aug. 8, 2014    (EP) .................................... 14180358

(51) Int. Cl.
*B23K 26/351*    (2014.01)
*H05B 3/84*    (2006.01)
(Continued)

(52) U.S. Cl.
CPC ............. *H05B 3/84* (2013.01); *B23K 26/351* (2015.10); *H05B 3/12* (2013.01); *B23K 2101/36* (2018.08);
(Continued)

(58) Field of Classification Search
CPC ........ H05B 2203/008; H05B 2203/011; H05B 2203/013; H05B 2203/017;
(Continued)

(56) References Cited

U.S. PATENT DOCUMENTS 5,877,473 A * 3/1999 Koontz ............. B32B 17/10036
219/203
7,026,577 B2    4/2006 Maeuser et al.
(Continued)

FOREIGN PATENT DOCUMENTS

CN    101962270 A    2/2011
CN    102484900 A    5/2012
(Continued)

OTHER PUBLICATIONS

WO2011/141487 A1 (Year: 2011).*
(Continued)

*Primary Examiner* — Tu B Hoang
*Assistant Examiner* — Tiffany T Tran
(74) *Attorney, Agent, or Firm* — Pillsbury Winthrop Shaw Pittman LLP

(57) ABSTRACT

A transparent pane, having at least one heatable, electrically conductive coating connected to at least two collection electrodes, provided for electrically connecting to a supply voltage to generate a heating current that flows across a heating field formed between the at least two collection electrodes is described. The heating field includes at least one communication window free from the heatable, electrically conductive coating. The transparent pane further includes at least one heatable, electrically conductive coating. The additional electrode is connected to one of the two collection electrodes via a respective current supply line.

16 Claims, 7 Drawing Sheets

(51) Int. Cl.
*H05B 3/12* (2006.01)
*B23K 101/36* (2006.01)

(52) U.S. Cl.
CPC .. *H05B 2203/008* (2013.01); *H05B 2203/011* (2013.01); *H05B 2203/013* (2013.01); *H05B 2203/016* (2013.01); *H05B 2203/017* (2013.01)

(58) Field of Classification Search
CPC ...... H05B 2203/031; H05B 3/12; H05B 3/84; H05B 2203/016; B23K 2101/36; B23K 26/351
USPC .......... 219/202, 203, 214, 522, 543
See application file for complete search history.

(56) References Cited

U.S. PATENT DOCUMENTS

| | | | |
|---|---|---|---|
| 8,431,869 B2* | 4/2013 | Raghavan | ............... H05B 3/84 219/203 |
| 8,895,897 B2* | 11/2014 | Dixon | ............... H05B 3/84 219/201 |
| 2002/0045037 A1 | 4/2002 | Boire et al. | |
| 2005/0045613 A1 | 3/2005 | Maeuser et al. | |
| 2010/0270280 A1 | 10/2010 | Blanchard et al. | |
| 2011/0108537 A1 | 5/2011 | Schall | |
| 2013/0161309 A1 | 6/2013 | Lisinski et al. | |
| 2014/0027434 A1 | 1/2014 | Reul et al. | |
| 2017/0265253 A1 | 9/2017 | Schall et al. | |

FOREIGN PATENT DOCUMENTS

| | | | | |
|---|---|---|---|---|
| DE | 102007008833 A1 | 8/2008 | | |
| DE | 102008020986 A1 | 12/2008 | | |
| DE | 102008018147 A1 | 10/2009 | | |
| DE | 202008017611 U1 | 4/2010 | | |
| EP | 0524527 A1 | 1/1993 | | |
| EP | 0524537 A2 * | 1/1993 | ....... | B32B 17/10174 |
| EP | 0524537 A2 | 1/1993 | | |
| EP | 0847965 B1 | 10/2004 | | |
| EP | 1626940 B1 | 6/2006 | | |
| EP | 1454509 B1 | 4/2007 | | |
| JP | H05-193355 A | 8/1993 | | |
| JP | H09-11860 A | 1/1997 | | |
| JP | 2005-511473 A | 4/2005 | | |
| JP | 2006-500754 A | 1/2006 | | |
| JP | 10-2009-0115733 A | 11/2009 | | |
| JP | 2013-526443 A | 6/2013 | | |
| KR | 10-2013-0139335 A | 12/2013 | | |
| WO | 03/051088 A2 | 6/2003 | | |
| WO | 2008/104728 A2 | 9/2008 | | |
| WO | 2011/141487 A1 | 11/2011 | | |
| WO | WO 2012/052315 A1 | 4/2012 | | |
| WO | WO 2012/110381 A1 | 8/2012 | | |

OTHER PUBLICATIONS

WO 2003051088 A2 (Year: 2003).*
International Search Report for PCT/EP2015/064480, dated Aug. 28, 2015. 6 pages.
International Search Report for PCT/EP2015/064482, dated Sep. 2, 2015. 6 pages.
Written Opinion issued for International Patent Application PCT/EP2015/064482, filed Jun. 26, 2015 on behalf of Saint-Gobain Glass France, dated Sep. 2, 2015. 19 pages (English Translation + German Original).
Written Opinion issued for International Patent Application PCT/EP2015/064480, filed Jun. 26, 2015 on behalf of Saint-Gobain Glass France, dated Aug. 28, 2015. 15 pages (English Translation + German Original).

* cited by examiner

TRANSPARENT PANE HAVING AN ELECTRICAL HEATING LAYER, METHOD FOR ITS PRODUCTION, AND ITS USE

CROSS REFERENCE TO RELATED APPLICATIONS

The present application is the U.S. national stage entry of International Patent Application No. PCT/EP2015/064482, filed internationally on Jun. 26, 2015, which, in turn, claims priority to European Patent Application No. 14180358.5, filed on Aug. 8, 2014.

The present invention is in the field of pane technology and relates to a transparent pane with an electrical heating layer, a method for its production, as well as its use.

Transparent panes with an electrical heating layer are known per se and have already been frequently described in the patent literature. Reference is made merely by way of example in this regard to the German published patent applications DE 102008018147 A1 and DE 102008020986 A1. In motor vehicles, they are frequently used as windshields since, due to legal regulations, the central field of vision must have no substantial vision restrictions. By means of the heat generated by the heating layer, condensed moisture, ice, and snow can be removed in a short time.

The heating current is usually introduced into the heating layer by at least one pair of strip- or band-shaped electrodes. As collection conductors or collection electrodes, these should, as uniformly as possible, introduce the heating current into the heating layer and distribute it broadly. The electrical sheet resistance of the heating layer is relatively high with the materials currently used in industrial series production and can be on the order of a few ohms per unit area. In order to nevertheless obtain adequate heating power for practical application, the supply voltage must be correspondingly high, but, for example, in motor vehicles, only an on-board voltage from 12 to 24 V is standardly available. Since the sheet resistance of the heating layer increases with the length of the current paths of the heating current, the collection conductors of opposite polarity should have the smallest possible distance between them. For motor vehicle windows, which are usually wider than they are high, the collection conductors are unfortunately therefore arranged along the two longer pane edges such that the heating current can flow over the shorter path of the pane height. However, this design results in the fact that the region of a resting or parking position of windshield wipers provided to wipe the pane customarily lies outside the heating field such that adequate heating power is no longer available there and the wipers can freeze.

There has been no lack of attempts to solve this serious problem.

Thus, European patent application EP 0 524 527 A2 presents a windshield provided with an electrical heating layer, wherein two flat heating strips are provided as heating elements in the region of a wiper parking zone. The heating strips are in each case electrically connected via a lower collection conductor arranged adjacent the lower pane edge to one pole and via a conducting wire to the other pole of a voltage source. It is disadvantageous in this arrangement that the lower collection conductor is additionally loaded with the current for the two heating strips.

In addition, the German patent application DE 102007008833 A1 and the international patent application WO 2008/104728 A2 present an electrically heatable windshield that is also heatable in the region of a wiper storage tray. For this purpose, heating wires that are connected to a lower collection conductor as a ground connection are provided. Independently of the pane heating in the field of vision, the heating wires are impinged upon by a potential. With this arrangement as well, the lower collection conductor is additionally loaded with the current for the heating wires.

In the European patent EP 1 454 509 B1 and the American U.S. Pat. No. 7,026,577 B2, a transparent pane is proposed, wherein a heatable field of vision is enclosed by two collection rails. Here, the field of vision is separated by one of the two collection rails and, in particular, by a de-coated region, from an additional heating region. In the additional heating region, further current collection rails of opposite polarity are provided to heat the pane in the masked region below the field of vision.

In the international patent application WO 2011/141487 A1, a transparent pane with a transparent heating coating which extends at least over a portion of the pane surface, in particular, across its field of vision, is proposed. The heating coating is divided by at least one heating-coating-free zone into at least one first heating coating zone and a second heating coating zone, wherein the two heating coating zones are electrically connected in each case to at least two collection conductors such that after application of a supply voltage that is provided by a voltage source, a current flows in each case via at least one first heating field formed by the first heating coating zone and at least one second heating field formed by the second heating coating zone. In the coating-free zone, at least one heating element is arranged, which has an ohmic resistance such that by application of the supply voltage to the heating element, the pane is heatable in a surface region containing the heating-coating-free zone. Here, the at least one heating element is implemented such that by application of the supply voltage to the heating element, the pane is heatable in at least one surface region adjacent the coating-free zone that contains at least one of the collection conductors.

And, not least, in the international patent application WO 2012/110381 A1, a transparent pane with an electrical heating layer, which extends over at least a portion of the pane surface and is electrically connectable by connection means to a voltage source, is proposed. Here, the connection means comprise a band-shaped first collection conductor and a band-shaped second collection conductor, which are, in each case, electrically conductively connected over the complete band length directly to the heating layer such that after application of the supply voltage, a heating current flows via a heating field formed by the heating layer. Here, the first collection conductor is directly connected electrically conductively to at least one first ribbon conductor; and the second collection conductor, to at least one ribbon conductor. In addition, the pane has at least one heating-field-free pane zone in which at least one electrical zone heating element is arranged. The zone heating element has an ohmic resistance such that by application of the supply voltage, the heating-field-free pane zone is heatable, with the zone heating element in parallel electrical connection to the heating field directly connected electrically conductively to the at least one first ribbon conductor and to the at least one second ribbon conductor.

To be sure, in particular, the heatable, transparent panes of the international patent applications WO 2011/141487 A1 and WO 2012/110381 A1 have brought certain progress; however, the increased demands of the market require further improvements of the panes known to date.

Thus, due to the geometry in the region of the resting or parking position of windshield wipers, the design of the pane according to the international patent application WO 2011/141487 A1 can be used only in a few automobile models. Moreover, in light of the variation of the supply voltage and the adaptation to different ohmic resistances of the heating layer, the design is not flexible enough to meet all the requirements.

The heatable, transparent pane of the international patent application WO 2012/110381 A1 has the disadvantages that an additional process step is required to apply the heating wires on the adhesive film made, for example, of polyvinyl butyral (PVB). Due to this additional process step, the adhesive film must be handled prior to lamination, which entails a higher rate of defects because of impurities and thus a higher reject rate.

A heatable glass that prevents condensation of water is known from the European patent EP 1 626 940 B1. The glass comprises, at least on one of its sides, a resistance layer or heating layer that includes a plurality of etchings/removals such than the glass obtains a predetermined desired electrical resistance. Here, the resistance layer or heating layer is subdivided by the etchings/removals into a plurality of regions connected to one another. In addition, the etchings/removals can be of the type that they form, in each case, regions of different geometric characteristics that, as a result, have different resistances and, consequently, different heating effects. The etchings/removals can be formed using laser technology or by grinding. The glasses are used primarily in freezers, as are customarily used in bars, confectioner shops, or supermarkets. Here, it is disadvantageous that the resistance layer or heating layer must be arranged between at least two busbars or collection conductors such that only very little or no heating power is present outside the resistance layer or heating layer. Whether or not this heatable glass is suitable as heating for the region of the resting or parking position of windshield wipers cannot be determined from the European patent. Besides that, the course of the current path cannot be clearly discerned from FIG. 3 of the European patent because the two longer busbars opposite one another are also separated by etchings/removals into two regions electrically isolated from one another. From the documents WO 2011/141487 A1, WO 03/051088 A2, U.S. Pat. No. 5,877,473 A, and EP 0 524 537 A2, other windshields with electrically heatable coatings and special measures for wiper field heating are known.

In contrast, the object of the present invention consists in advantageously improving the previously known, heatable, transparent panes having an electrical heating layer and heating of the region of the resting or parking position of windshield wipers (hereinafter referred to as "wiper parking zone"). The improved, heatable, transparent panes should have heating of the region of the wiper parking zone that can be produced at low cost, with their design being readily adaptable to different ohmic resistances of the electrical heating layer and different supply voltage levels.

These and other objects are accomplished according to the proposal of the invention by a heatable, transparent pane with the characteristics of the independent patent claim. Further advantageous embodiments of the invention are indicated by the characteristics of the subclaims.

In an advantageous embodiment of the pane according to the invention, the surface of the first pane, on which the electrically heatable coating is arranged, is areally bonded to a second pane via a thermoplastic intermediate layer.

As the first and, optionally, the second pane, all electrically insulating substrates that are thermally and chemically stable as well as dimensionally stable under the conditions of the production and use of the pane according to the invention are, in principle, suitable.

The first pane and/or the second pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethylmethacrylate, polystyrene, polyamide, polyester, polyvinyl chloride, and/or mixtures thereof. The first pane and/or the second pane are preferably transparent, in particular for the use of the pane as a windshield or rear window of a motor vehicle or other uses in which high light transmittance is desired. In the context of the invention, "transparent" means a pane that has transmittance >70% in the visible spectral range. For panes that are not in the traffic-relevant field of vision of the driver, for example, for roof panels, the transmittance can, however, also be much lower, for example, >5%.

The thickness of the pane according to the invention can vary widely and thus be eminently adapted to the requirements of the individual case. Preferably, panes with the standard thicknesses of 1.0 mm to 25 mm, preferably of 1.4 mm to 2.5 mm for motor vehicle glass and preferably of 4 mm to 25 mm for furniture, appliances, and buildings, in particular for electric heaters, are used. The size of the pane can vary widely and is governed by the size of the use according to the invention. The first pane and, optionally, the second pane have, for example, in the automotive industry and architectural sector, usual areas of 200 $cm^2$ up to 20 $m^2$.

The pane according to the invention can have any three-dimensional shape. Preferably, the three-dimensional shape has no shadow zones such that it can, for example, be coated by cathodic sputtering. Preferably, the substrates are planar or slightly or greatly curved in one or a plurality of spatial directions. In particular, planar substrates are used. The panes can be colorless or colored.

Multiple panes are bonded to one another via at least one intermediate layer. The intermediate layer preferably contains at least one thermoplastic plastic, preferably polyvinyl butyral (PVB), ethylene vinyl acetate (EVA), and/or polyethylene terephthalate (PET). The thermoplastic intermediate layer can, however, also contain, for example, polyurethane (PU), polypropylene (PP), polyacrylate, polyethylene (PE), polycarbonate (PC), polymethylmethacrylate, polyvinylchloride, poly acetate resin, casting resins, fluorinated ethylene propylene copolymers, polyvinyl fluoride, and/or ethylene tetrachloroethylene copolymers, and/or copolymers or mixtures thereof. The thermoplastic intermediate layer can be formed by one or even by a plurality of thermoplastic films arranged one above another, wherein the thickness of one thermoplastic film is preferably from 0.25 mm to 1 mm, typically 0.38 mm or 0.76 mm.

In a composite pane according to the invention composed of a first pane, an intermediate layer, and a second pane, the electrically heatable coating can be applied directly onto the first pane or onto a carrier film or onto the intermediate layer itself. The first pane and the second pane have, in each case, an inside surface and an outside surface. The inside surfaces of the first and second pane are turned toward one another and bonded to one another via the thermoplastic intermediate layer. The outside surfaces of the first and second pane are turned away from one another and from the thermoplastic intermediate layer. The electrically conductive coating is applied onto the inside surface of the first pane. Of course, another electrically conductive coating can also be applied onto the inside surface of the second pane. Even the outside surfaces of the panes can have coatings. The terms "first pane" and "second pane" are selected to distinguish between the two panes in a composite pane according to the invention. No information concerning the geometric arrangement is associated with the terms. If the pane according to the invention is provided, for example, in an opening, for example, of a motor vehicle or of a building, to separate the interior from the external environment, the first pane can face the interior or the external environment.

The transparent pane according to the invention comprises an electrically conductive, heatable, transparent coating that extends at least over a substantial portion of the pane surface, in particular, over its field of vision. The electrically conductive coating is electrically connected to at least two, in particular, two, collection electrodes for electrically connecting to the two poles of a voltage source such that by application of a supply voltage, a heating current flows via a heating field formed between the two collection electrodes. Typically, the two collection electrodes are implemented in each case in the shape of a strip- or band-shaped electrode or collection rail or bus bar for the introduction and broad distribution of the current in the conductive coating. For this purpose, they are galvanically connected to the heating layer.

At least one, in particular, one, of the two collection electrodes, in particular, the upper collection electrode in the installed state of the transparent pane, can be subdivided into at least two, in particular, two, subregions separated from one another.

In an advantageous embodiment, the collection electrode is implemented as a printed-on and fired conductive structure. The printed-on collection electrode preferably contains at least one metal, a metal alloy, a metal compound, and/or carbon, particularly preferably a noble metal and, in particular, silver. The printing paste for producing the collection electrode preferably contains metal particles and/or carbon and, in particular, noble metal particles such as silver particles. The electrical conductivity is preferably achieved by means of the electrically conducting particles. The particles can be situated in an organic and/or inorganic matrix such as pastes or inks, preferably as printing paste with glass frits.

The layer thickness of the printed-on collection electrode is preferably from 5 µm to 40 µm, particularly preferably from 8 µm to 20 µm, and most particularly preferably from 8 µm to 12 µm. Printed-on collection electrodes with these thicknesses are technically easy to realize and have advantageous current carrying capacity.

The specific resistance $\rho_a$ of the collection electrode is preferably from 0.8 µohm·cm to 7.0 µohm·cm and particularly preferably from 1.0 µohm·cm to 2.5 µohm·cm. Collection electrodes with specific resistances in this range are technically easy to realize and have advantageous current carrying capacity.

Alternatively, the collection electrode can, however, also be implemented as a strip or in the case of a collection electrode subdivided into subregions as at least two, in particular, two, strips of an electrically conductive film. The collection electrode then includes, for example, at least aluminum, copper, tinned copper, gold, silver, zinc, tungsten, and/or tin or alloys thereof. The strip preferably has a thickness from 10 µm to 500 µm, particularly preferably from 30 µm to 300 µm. Collection electrodes made of electrically conductive foils with these thicknesses are technically easy to realize and have advantageous current carrying capacity. The strips can be electrically conductively connected to the electrically conductive structure, for example, via a soldering compound, via an electrically conductive adhesive, or by direct placement.

The electrically conductive coating of the pane according to the invention can be subdivided into a heating field, i.e., the heatable portion of the electrically conductive coating that is situated between the two collection electrodes such that a heating current can be introduced, and a region outside the heating field mentioned.

Electrically heatable coatings are known, for example, from DE 20 2008 017 611 U1, EP 0 847 965 B1, or WO2012/052315 A1. They typically include one functional layer or a plurality, for example, two, three, or four electrically conductive functional layers. The functional layers preferably include at least one metal, for example, silver, gold, copper, nickel, and/or chromium, or a metal alloy. The functional layers particularly preferably include at least 90 wt.-% of the metal, in particular, at least 99.9 wt.-% of the metal. The functional layers can be made of the metal or the metal alloy. The functional layers particularly preferably include silver or a silver-containing alloy. Such functional layers have particularly advantageous electrical conductivity with simultaneously high transmittance in the visible spectral range. The thickness of the functional layer is preferably from 5 nm to 50 nm, particularly preferably from 8 nm to 25 nm. In this range for the thickness of the functional layer, advantageously high transmittance in the visible spectral range and particularly advantageous electrical conductivity are obtained.

Typically, at least one dielectric layer is arranged in each case between two adjacent functional layers of the electrically conductive coating. Preferably, another dielectric layer is arranged below the first and/or above the last functional layer. A dielectric layer includes at least one individual layer made of a dielectric material, for example, a nitride such as silicon nitride or an oxide such as aluminum oxide. The dielectric layer can, however, also comprise multiple individual layers, for example, individual layers of a dielectric material, smoothing layers, adaptation layers, blocker layers, and/or antireflection layers. The thickness of a dielectric layer is, for example, from 10 nm to 200 nm.

This layer structure is generally obtained by a succession of deposition procedures that are performed by a vacuum method such as magnetically enhanced cathodic sputtering.

Other suitable electrically conductive coatings preferably include indium tin oxide (ITO), fluorine-doped tin oxide ($SnO_2$:F), or aluminum-doped zinc oxide (ZnO:Al).

The electrically conductive coating can, in principle, be any coating that is intended to be electrically contacted. If the pane according to the invention is intended to enable vision through it, as is, for example, the case with panes in the window sector, the electrically conductive coating is preferably transparent. The electrically conductive coating is preferably transparent to electromagnetic radiation, particularly preferably to electromagnetic radiation of a wavelength from 300 to 1300 nm and, in particular, for visible light.

In an advantageous embodiment, the electrically conductive coating is a layer or a layer structure of a plurality of individual layers with a total thickness less than or equal to 2 µm, particularly preferably less than or equal to 1 µm.

One advantageous electrically conductive coating has a sheet resistance from 0.4Ω/□ to 10Ω/□. In a particularly preferred embodiment, the electrically conductive coating according to the invention has a sheet resistance from 0.5Ω/□ to 1Ω/□. Coatings with such sheet resistances are particularly suited for heating motor vehicle window panes with typical onboard voltages of 12 V to 48 V or in electric vehicles with typical onboard voltages of up to 500 V.

The electrically conductive coating can extend over the entire surface of the first pane. Alternatively, however, the electrically conductive coating can extend only over a portion of the surface of the pane. The electrically conductive coating preferably extends over at least 50%, particularly preferably over at least 70%, and most particularly preferably over at least 90% of the inside surface of the first pane.

In an advantageous embodiment of a transparent pane according to the invention as a composite pane, the inside surface of the first pane has a peripheral edge region with a width from 2 mm to 50 mm, preferably from 5 mm to 20 mm, that is not provided with the electrically conductive coating. The electrically conductive coating then has no contact with the atmosphere and, in the interior of the pane, is protected by the thermoplastic intermediate layer against damage and corrosion.

In the transparent pane according to the invention, the heating field includes at least one coating-free zone in which no electrically conductive coating is present. The coating-free zone is bounded by a zone edge formed, at least in sections, by the electrically conductive coating.

In particular, the coating-free zone has a peripheral zone edge that is completely formed by the electrically conductive coating.

However, the zone edge can transition into the peripheral coating edge of the electrically conductive coating such that the coating-free zone is directly connected to the coating-free edge strip of the transparent pane according to the invention surrounding the pane edges.

The coating-free zone can have a wide variety of outlines. Thus, the outline can be square, rectangular, trapezoidal, triangular, pentagonal, hexagonal, heptagonal, or octagonal with rounded corners and/or curved edges as well as circular, oval, drop-shaped, or elliptical. The outlines can have a rectilinear, wave-shaped, zigzag, and/or sawtooth-shaped course. A plurality of these geometric characteristics can be implemented in one and the same coating-free zone.

In particular, the coating-free zone serves as a communication window that is permeable to electromagnetic radiation, in particular, IR radiation, radar radiation, and/or radio radiation. In addition, sensors, for example, rain sensors, can also be placed in the communication window.

The coating-free zone can, for example, be produced by masking during the application of the heating layer on a substrate or by removal of the heating layer, for example, by mechanical and/or chemical removal and/or by removal by irradiation with electromagnetic radiation, in particular laser light irradiation, after application of the electrically heatable coating.

In a preferred embodiment, at least one coating-free zone is present. Preferably, at least two and in particular at least three coating-free zones are present.

Preferably, the at least one coating-free zone or the at least one communication window is arranged in the installed state of the transparent pane in its upper region.

The collection electrodes and/or their subregions are electrically contacted by one or a plurality of supply lines.

The supply line is preferably implemented as a flexible film conductor or flat conductor or ribbon cable. This means an electrical conductor whose width is clearly greater than its thickness. Such a flat conductor is, for example, a strip or a band, including or made of copper, tinned copper, aluminum, silver, gold, or alloys thereof. The flat conductor has, for example, a width of 2 mm to 16 mm and a thickness of 0.03 mm to 0.1 mm. The flat conductor can have an insulating, preferably polymeric sheath, for example, based on polyimide. Flat conductors that are suitable for the contacting of electrically conductive coatings in panes have a total thickness of, for example, only 0.3 mm. Such thin flat conductors can be embedded without difficulty between the individual panes in the thermoplastic intermediate layer. A plurality of conductive layers electrically isolated from one another can be situated in a ribbon cable.

Alternatively, thin metal wires can also be used as the electrical supply line. The metal wires include, in particular, copper, tungsten, gold, silver, or aluminum or alloys of at least two of these metals. The alloys can also include molybdenum, rhenium, osmium, iridium, palladium, or platinum.

In a preferred embodiment of the transparent pane according to the invention, each of the at least two, in particular, two, collection electrodes is electrically conductively connected by a flat conductor in each case to the poles of the voltage source.

In another preferred embodiment, the at least two, in particular, two, subregions of the at least one, in particular, one, collection electrode are electrically conductively connected in each case to a flat conductor connected to a voltage source. Preferably, the flat conductors are arranged in the region of the subregions that is near the respective associated second side of the pane edge. In this embodiment, the electrical isolation of the flat conductors from the power supply lines is done by spatial separation of the components.

In yet another preferred embodiment, the at least two, in particular, two, subregions of the at least one, in particular, one, collection electrode are electrically conductively connected to a flat conductor. Preferably, in this embodiment, the flat conductor is arranged centrally between the two opposing ends of the subregions. Preferably, this is accomplished by a common electrically conductive connecting part or by two electrically conductive connecting parts associated with the respective subregion. The flat conductor can be connected to the electrically conductive connecting part by a flat metal strip, in particular, a copper strip.

Here, the flat conductor and the at least one connecting part as well as, optionally, the flat metal strip, in particular a copper strip, are arranged electrically isolated from the at least two power supply lines.

In this case, the electrical isolation between the flat conductor and the connecting part on the one hand and the at least two power supply lines on the other is accomplished by means of an electrically isolating layer, in particular by means of a strip-shaped, electrically isolating layer, between the flat conductor and the connecting part on the one hand and the at least two power supply lines on the other hand. The electrically isolating layer, in particular the strip-shaped, electrically isolating layer, covers at least the points of intersection of the connecting part with the at least two power supply lines. It can, however, also abut the two end edges of the subregions opposite one another.

Preferably, this arrangement has as a whole a layered structure composed of the following layers positioned one over another:
  a pane,
  sections of the power supply lines covered by the insulation,
  subregions of the coating adjacent the power supply lines outside the heating field, on whose zone edges the edges of the electrically isolating layer opposite one another abut; likewise these edges can abut the end edges of the two subregions of the collection electrode opposite one another
  a flat conductor resting on the electrically isolating layer subregions of the collection electrode, as well as
  the connecting part electrically connected thereto.

A substantial advantage of this arrangement is that only one additional flat conductor is required for supplying two subregions of one collection electrode, which substantially simplifies the production of the transparent pane according to the invention.

For the transparent pane according to the invention, it is essential that it has, outside the heating field and spatially separated therefrom by at least one, in particular, one, of the above described collection electrodes along at least one, in particular, one, first side of the pane edge, at least one further, in particular, one, heatable, electrically conductive coating of the above described type. Preferably, this further heatable, electrically conductive coating is arranged, in the installed state of the pane according to the invention, below the lower collection electrode and/or above the upper collection electrode in the region of the wiper parking zone.

In this further heatable, electrically conductive coating, in the region of the two second sides of the pane edge, at least one additional electrode is in each case arranged. Preferably, these at least two additional electrodes are, in the installed state of the pane according to the invention, aligned vertically. They are, in each case, connected via at least one, in particular, one, power supply line to a collection electrode, which has a polarity opposite the nearest collection electrode. This means that when the upper collection electrode is electrically connected to the positively charged pole of a voltage source, the two additional electrodes located above the upper collection electrode are electrically connected via the power supply lines to the negatively charged lower collection electrode. If, on the other hand, the additional electrodes are arranged in the lower further heatable, electrically conductive coating below the, for example, negatively charged lower collection electrode, they are electrically connected via the power supply lines to the positively charged upper collection electrode. The person skilled in the art can readily specify other configurations based on this technical teaching.

Preferably, the additional electrodes and the power supply lines are very much longer than they are wide. The length depends mainly on the size of the pane according to the invention. Preferably, the width is from 10 μm to 10 mm, in particular 10 μm to 1 mm. Preferably, they have the same thickness as the collection electrodes.

Particularly preferably, the power supply lines have a constant thickness and width over their entire length.

The power supply lines extend along the respective associated coating edge and along the two second sides of the pane edge, at least in sections in the associated edge strip, on the associated subsection of the peripheral coating edge electrically decoupled from the heating field by, in each case, at least one associated coating-free line, and/or in and/or on the respective associated electrically conductive coating outside the heating field electrically decoupled from the heating field by, in each case, at least one associated coating-free line.

Preferably, the power supply lines run, in each case, on the associated electrically conductive coating outside the heating field.

Preferably, the power supply lines are, at least in sections, straight, wave-shaped, meander-shaped, sawtooth-shaped, and/or zigzag-shaped. Preferably, the power supply lines run in a straight line over their entire length.

The pane according to the invention has, in at least one, in particular one, further heatable, electrically conductive coating at least one, in particular at least two, counter electrode(s) associated with the respective additional electrode and electrically coupled to the associated collection electrode of opposite polarity. In the context of the invention, the term "coupled" is to be interpreted as "electrically connected via the electrically conductive coating".

Preferably, the additional electrodes opposite one another and the counter electrode opposite one another are arranged as a mirror image relative to the centerline or axis of symmetry of the pane according to the invention.

The pane according to the invention also has, in at least one, in particular, one, further heatable, electrically conductive coating, at least two, in particular, two, systems of, in each case, at least four, preferably at least five coating-free lines, which systems are arranged as a mirror image (in particular as a mirror image relative to the vertical centerline and axis of symmetry of the transparent pane) relative to one another, which are arranged such that they direct the heating current, flowing upon application of a supply voltage from the at least two additional electrodes via, in each case, at least one, preferably at least two, counter electrode(s) associated in each case therewith, to the at least one collection electrode of the respective opposite polarity, with the coating-free lines defining the current paths an and their length.

The additional electrode is connected directly to a collection rail via the power supply line. In contrast thereto, the counter electrode is not directly connected to the other collection rail of opposite polarity. The so-called "counter electrode" is, consequently, actually not an electrode in the actual sense, but rather a connection conductor that connects to one another two coating segments that are formed by the coating-free lines such that a current can flow between the coating segments.

The current flow of all current paths $a_1$-$a_n$ is driven by the difference in potential between the additional electrode (connected to the first collection rail) and the second collection rail. The segmentation of the conductive coating formed by the coating-free lines as well as the connection of the segments by means of the counter electrode(s)/connection conductors serve to direct the current flow in the form of the current paths $a_1$-$a_n$.

According to the invention, the equation I applies to the current paths $a_n$ in a system of coating-free lines:

$$VH_1 = h_1:b_n = 0.5 \text{ to } 2.0, \text{ preferably } 0.75 \text{ to } 1.5 \text{ and, in particular, } 0.8 \text{ to } 1.2 \quad \text{(I)},$$

where $VH_1$ represents the mathematical relationship ($h_1:b_n$), n represents a whole number from 2 to 30, preferably 2 to 25 and, in particular, 3 to 20. $h_1$ represents the height of the current path $a_1$, $b_n$ represents the width of a current path $a_n$.

The height $h_1$ of the current path $a_1$ is the imaginary stretch that is arranged vertically relative to the flow direction of the current between two adjacent coating-free lines.

$a_1$ is the current path from the additional electrode all the way to the nearest opposing section of the counter electrode (connection conductor). $a_2$ to $a_n$ designate the other current paths. The terms $a_1$-$a_n$ can refer to the current paths themselves or, also, to the length thereof.

The width $b_n$ of a current path $a_n$ is the imaginary stretch that is arranged vertically relative to the flow direction of the current between two adjacent coating-free lines.

Preferably, the widths $b_n$ are arranged parallel or roughly parallel to one another, preferably at an imaginary angle of ±30°, preferably ±20°, and, in particular, ±10°.

The relationships of the lengths of the individual current paths $a_1$ to $a_n$ has no effects on the specific heating power in these current path sections. The specific heating power is influenced only by the total length, in other words, by the total resistance of the current paths $(a_1+a_2+a_3+ \ldots a_n)$ as well as by the relationship $VH_1$ of the width of the sections.

The coating-free lines run, at least in sections, continuously and/or as broken lines of discrete cuts. Preferably, they run continuously in their entire length, i.e., without cuts.

The length of the coating-free lines can vary widely and, consequently, be advantageously adapted to the requirements of the individual case. The width of the coating-free lines is very much less than their length and can vary in their course. Preferably, the width is constant over the entire course. Preferably, the width is in the range from 10 µm to 1 mm.

By means of this system of at least four coating-free lines, at least two current paths $a_n$ are defined in the relevant lower and/or upper, in particular, the lower additional heatable, electrically conductive coating(s). Upon application of a supply voltage, the heating current flows in the system from the at least one additional electrode via the at least one counter electrode (connection conductor) via the current paths to the lower and/or upper collection electrode(s).

Here, it is a very particular advantage of the system according to the invention that by this means the lower and/or upper additional, heatable, electrically conductive coating(s) is or are heated uniformly, with the specific heating power at 300 to 900 W/m² and preferably at 350 to 800 W/m².

Another particular advantage of the configuration comprising additional electrodes, counter electrodes (collection conductors), and systems of coating-free lines is that the entire configuration can be adapted simply, for example, by simple parallel shifts of the additional electrodes and/or of the counter electrode (collection conductor), to the requirements of the individual case without the specific heating power adversely changing—for example, through the occurrence of hot spots and/or cold spots. The optimum configuration for the individual case can be determined in a simple manner using customary, known simulation programs.

Overall, the configuration of the pane according to the invention very effectively prevents resting windshield wipers from freezing in the wiper parking zone even with particularly low temperatures <0° C., in particular <−10° C.

In a preferred embodiment of the transparent pane according to the invention, the regions in which the collection electrodes, the flat conductor(s), the additional electrode or the additional electrodes, the power supply lines as well as the system of the coating-free lines are arranged partially or completely masked by customary, known, visually concealing, opaque or non-transparent masking strips. The masking strip hides these and other functional elements in these regions and also protects them against UV radiation, which can damage the functional elements. Specifically, the black masking strip includes a visually concealing, opaque subregion that transitions at its edge into the visually partially transparent subregion. The visually partially transparent subregion is, for example, a dot grid. Preferably, the masking strip is applied on the inner side of the outer pane, i.e., the side turned toward the inner pane, by screen printing and fired before the two panes are bonded together with the adhesive layer.

Preferably, the pre-products of the masking strips are applied by screen printing on the as yet uncoated panes after which the layers applied are fired.

The panes according to the invention can be produced in customary, known ways.

Preferably, they are produced using the method according to the invention.

The method according to the invention comprises the following process steps:
(A) Producing an electrically conductive coating;
(B) Producing at least one coating-free communication window in the electrically conductive coating of the heating field;
(C) Forming
  (c1) at least two collection electrodes connected to the two poles of a voltage source, which collection electrodes are electrically connected to the electrically conductive coating such that by application of a supply voltage, a heating current flows via a heating field situated between the two collection electrodes, and/or
  (c2) at least two collection electrodes connected to the two poles of a voltage source, which collection electrodes are electrically connected to the electrically conductive coating, wherein at least one of the two collection electrodes is implemented divided into at least two subregions spatially separated from one another;
(D) Producing
  (d1) at least two additional electrodes opposite one another as a mirror image relative to the centerline (and axis of symmetry) of the transparent pane;
  (d2) at least two counter electrodes (connection conductors) opposite one another as a mirror image relative to the centerline (and axis of symmetry) of the transparent pane and electrically associated with the additional electrodes, which are electrically coupled (i.e., electrically connected via the electrically conductive coating) upon application of a supply voltage to the collection electrode of opposite polarity;
  (d3) at least two power supply lines arranged as a mirror image of each other relative to the centerline (and axis of symmetry) of the transparent pane connecting in each case at least one additional electrode to at least one collection electrode or in each case to at least one of their subregions, which supply lines run along the respective associated coating edge and along the two second sides of the pane edge, at least in sections
    in the associated edge strip in each case,
    on the associated subsection of the peripheral coating edge electrically decoupled from the heating field by at least one associated coating-free line in each case, and/or
    in the associated electrical coating in each case outside the heating field electrically decoupled by at least one associated coating-free line in each case;
(E) Forming
  (e1) at least two coating-free lines running along the power supply lines on the side of the heating field as well as
  (e2) at least two systems of at least four coating-free lines in each case positioned opposite one another as a mirror image, which are arranged such that they, upon application of a supply voltage, direct the heating current flowing from the at least two additional electrodes via at least two current paths an to the at least one collection electrode of opposite polarity in each case, wherein the equation I applies for the current paths $a_n$ in the system of coating-free lines:

$$VH_1 = h_1 : b_n = 0.5 \text{ to } 2.0, \text{ preferably } 0.75 \text{ to } 1.5 \text{ and, in particular, } 0.8 \text{ to } 1.2 \quad\quad (I),$$

where
  n represents a whole number from 2 to 30, preferably 2 to 25 and, in particular, 3 to 20, ($a_1$) designates the current path from the additional electrode all the way to the nearest opposing section of the counter electrode (connection conductor), ($h_1$) represents the height of the current path $a_1$ ($a_2 \ldots a_n$) designates the other current paths, $b_n$ represents the width of another current path $a_n$, and ($VH_1$) represents the mathematical relationship ($h_1$:$b_n$);

(F) wherein the process steps (B) and (E) are performed one after the other or simultaneously and (G) the process steps (C) and (D) are performed simultaneously or one after the other as well as before or after the process steps (B) and (E).

The relationships of the lengths of the individual current paths $a_1$ to $a_n$ has no effects on the specific heating power in these current path sections. The specific heating power is influenced only by the total length, in other words, by the total resistance of the current paths ($a_1+a_2+a_3+ \ldots a_n$) as well as by relationship $VH_1$ of the width of the sections.

In another preferred embodiment of the method according to the invention, the at least four coating-free lines as well as the at least two systems are produced by laser ablation of the electrically conductive coating inside and outside the heating field.

In another preferred embodiment, the process steps (C) and (D) are performed using screen printing.

Specifically, the application of the electrically conductive coating in process step (A) can be done by methods known per se, preferably by magnetic field enhanced cathodic sputtering. This is particularly advantageous with regard to simple, fast, inexpensive, and uniform coating of the first pane when the pane according to the invention is designed as a composite pane. The electrically conductive, heatable coating can, however, also be applied, for example, by vapor deposition, chemical vapor deposition (CVD), plasma enhanced chemical vapor deposition (PECVD), or by wet chemical methods.

The first pane can be subjected to a temperature treatment after process step (A). Here, the first pane is heated with the electrically conductive coating to a temperature of at least 200° C., preferably at least 300° C. The temperature treatment can serve for increasing the transmittance and/or reducing the sheet resistance of the electrically conductive coating.

The first pane can be bent after process step (A), typically at a temperature of 500° C. to 700° C. Since it is technically easier to coat a flat pane, this procedure is advantageous when the first pane is to be bent. However, alternatively, the first pane can also be bent before process step (A), for example, when the electrically conductive coating it is not suitable to withstand a bending process without damage.

The application of the collection electrodes in process step (C) and the power supply lines in process step (E) is preferably done by printing and firing an electrically conductive paste in a screen printing method or an inkjet method. Alternatively, the collection electrodes and the power supply lines can be applied as strips of an electrically conductive film on the electrically conductive coating, preferably placed, soldered, or glued.

In screen printing methods, the lateral shaping is done by masking of the fabric through which the printing paste with the metal particles is pressed. By suitable shaping of the masking, the width of the collection electrode can, for example, be particularly easily predefined and varied.

The coating-free zones are produced in process step (B) preferably by mechanical removal of the heatable coating produced in process step (A). The mechanical removal can also be replaced or supplemented by treatment with suitable chemicals and/or by irradiation with electromagnetic radiation.

An advantageous improvement of the method according to the invention comprises at least the following additional steps:

arranging a thermoplastic intermediate layer on the coated surface of the first pane and arranging a second pane on the thermoplastic intermediate layer and bonding the first pane and the second pane via the thermoplastic intermediate layer.

In these process steps, the first pane is arranged such that the one of its surfaces that is provided with the heatable coating faces the thermoplastic intermediate layer. The surface thus becomes the inner surface of the first pane.

The thermoplastic intermediate layer can be formed by a single thermoplastic film or even by two or more thermoplastic films that are arranged areally one over another.

The bonding of the first and the second pane is preferably done under the action of heat, vacuum, and/or pressure. Methods known per se for producing a pane can be used.

So-called autoclave methods can, for example, be performed at an elevated pressure of roughly 10 bar to 15 bar and temperatures from 130° C. to 145° C. for roughly 2 hours. Vacuum bag or vacuum ring methods known per se operate, for example, at roughly 200 mbar and 80° C. to 110° C. The first pane, the thermoplastic intermediate layer, and the second pane can also be pressed in a calendar between at least one pair of rollers to form a pane. Systems of this type for producing panes are known and normally have at least one heating tunnel upstream from a pressing facility. The temperature during the pressing procedure is, for example, from 40° C. to 150° C. Combinations of calendar and autoclave methods have particularly proven their value in practice. Alternatively, vacuum laminators can be used. These consist of one or a plurality of heatable and evacuable chambers, in which the first pane and the second pane are laminated within, for example, roughly 60 minutes at reduced pressures of 0.01 mbar to 800 mbar and temperatures from 80° C. to 170° C.

The transparent pane according to the invention, in particular the transparent pane produced using the method according to the invention, can be used excellently as a functional and/or decorative individual piece and/or as a built-in part in furniture, appliances, and buildings, as well as in means of transportation for travel on land, in the air, or on water, in particular in motor vehicles, for example, as a windshield, rear window, side window, and/or glass roof. Preferably, the transparent pane according to the invention is implemented as a motor vehicle windshield or a motor vehicle side window.

It is understood that the above mentioned characteristics and those detailed in the following can be used not only in the combinations and configurations specified, but also in other combinations and configurations or alone without departing from the scope of the present invention.

BRIEF DESCRIPTION OF THE FIGURES

The invention is now explained in detail with reference being made to the accompanying figures. They depict in simplified, not-true-to-scale representation.

DETAILED DESCRIPTION OF THE FIGURES

Figure 1:
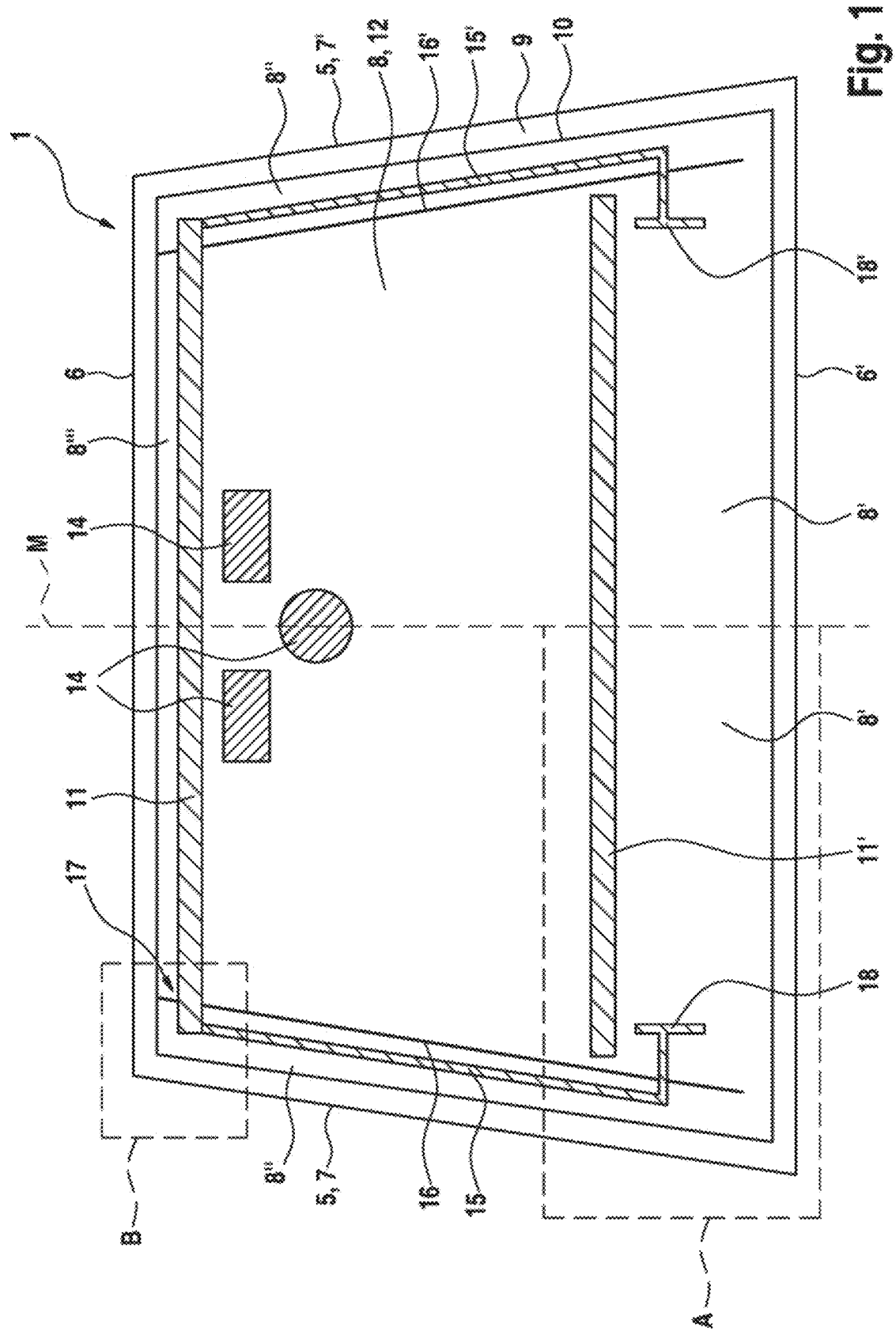
FIG. 1 a plan view of a windshield 1 according to the invention in simplified representation.
Figure 2:
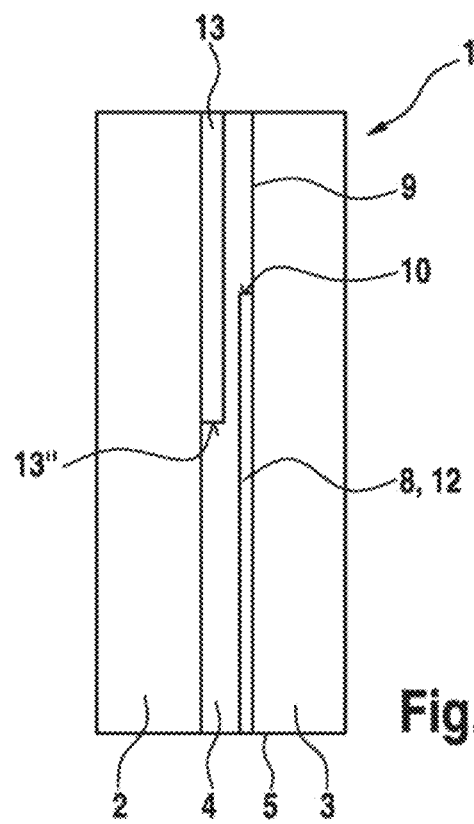
FIG. 2 a view of a vertical section through a detail of the windshield according to the invention of FIG. 1.
Figure 3:
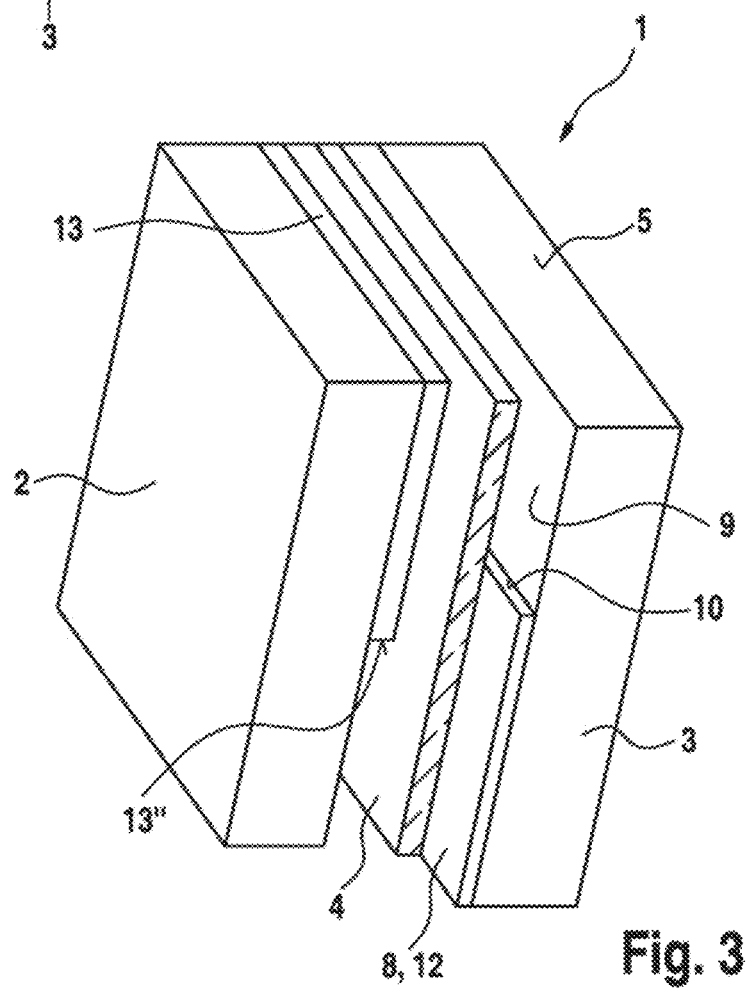
FIG. 3 a perspective view of a detail of the windshield according to the invention of FIG. 1.
Figure 4:
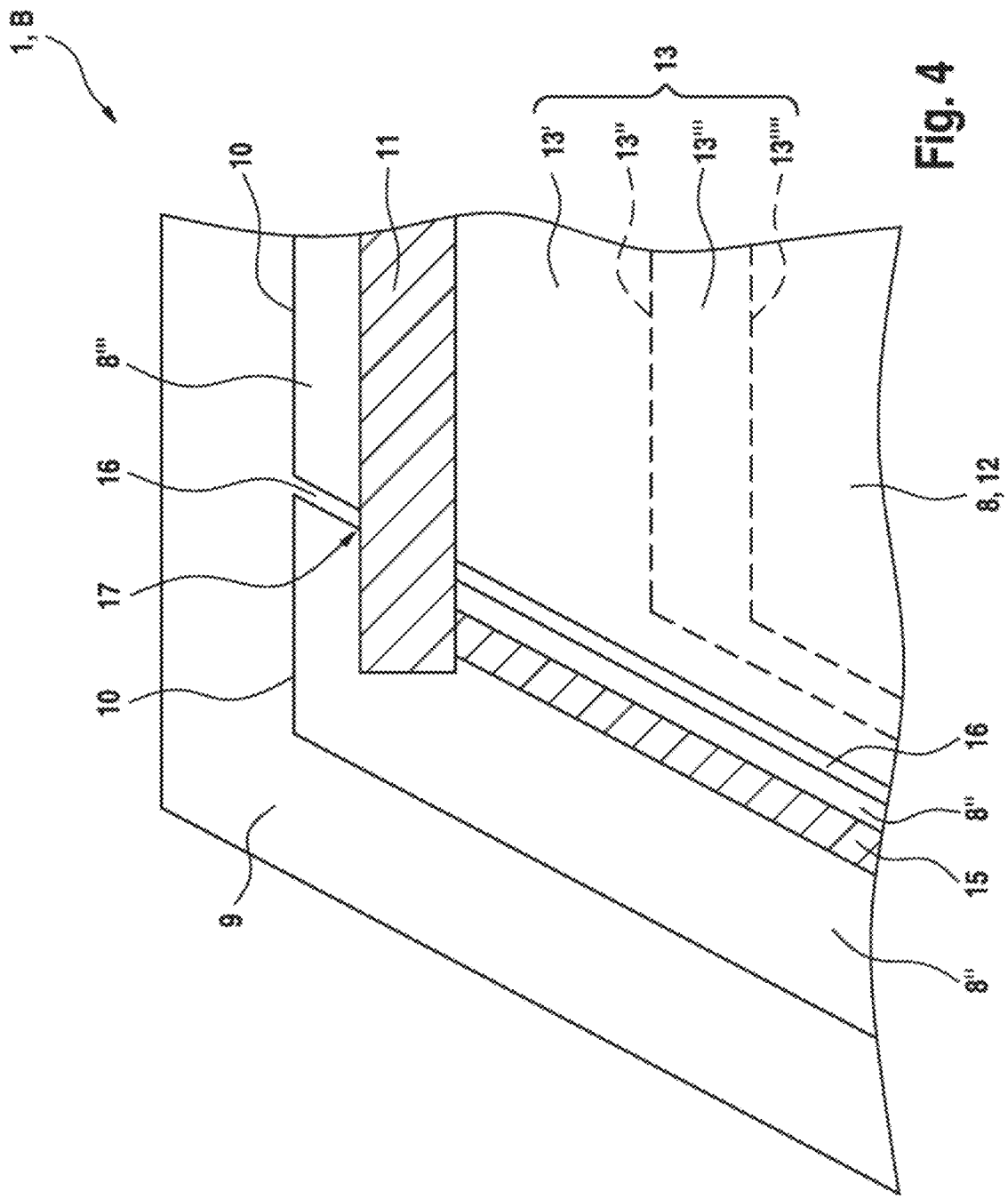
FIG. 4 a plan view of the detail B of the windshield 1 according to the invention of FIG. 1.

FIG. 1 in Conjunction with FIGS. 2, 3, and 4

FIG. 1 depicts a transparent windshield 1 of a motor vehicle viewed from the inside in a simplified representation. Here, the windshield is implemented, for example, as a composite pane, whose structure is illustrated using the representation of a vertical section through a detail of the windshield 1 in FIG. 2 and using the perspective representation of a detail of the windshield 1 in FIG. 3.

Accordingly, the windshield 1 comprises two rigid individual panes, namely an outer pane 2 and an inner pane 3 that are firmly bonded to one another by a thermoplastic adhesive layer 4, here, for example, polyvinyl butyral film (PVB), an ethylene vinyl acetate film (EVA), or a polyurethane film (PU). The two individual panes 2, 3 have roughly the same size and shape and can, for example, have a trapezoidal curved contour, not shown in detail in the figures. They are made, for example, of glass, also possibly being constructed from a non-glass material such as plastic. For applications other than windshields, it would also be possible to produce the two individual panes 2, 3 from a flexible material. The contour of the windshield 1 is determined by a pane edge 5, common to the two individual panes 2, 3, the windshield 1 having, at the top and bottom, two first sides 6, 6' positioned opposite one another as well as, on the left and the right, two second sides 7, 7' opposite one another.

As shown in FIGS. 2 and 3, a transparent, electrically conductive coating 8 is deposited on the side of the inner pane 3 bonded to the adhesive layer 4. Here, the heatable, electrically conductive coating 8 is, for example, applied substantially to the entire surface of the inner pane 3, with a peripheral edge strip 9 on all sides not coated, such that a coating edge 10 of the electrically conductive coating 8 is set back inwardly relative to the pane edge 5. By this means, electrical isolation of the electrically conductive coating 8 relative to the outside is effected. Moreover, the electrically conductive coating 8 is protected against corrosion penetrating from the pane edge 5.

The electrically conductive coating 8 comprises, in a known manner, a layer sequence (not shown) with at least one electrically heatable, metallic sublayer, preferably silver, and, optionally, other sublayers such as antireflective and blocker layers. Advantageously, the layer sequence has high thermal stability such that it withstands the temperatures of typically 600° C. required for bending glass panes without damage, but also with the possibility of providing layer sequences with low thermal stability. It is equally possible for the electrically conductive coating 8 to be applied as a metallic single layer. It is likewise conceivable not to apply the electrically conductive coating 8 directly on the inner pane 3 but, instead, to apply it first on a carrier, for example, a plastic film that is subsequently glued to the outer and inner pane 2, 3. Alternatively, the carrier film can be bonded to adhesive films (e.g., PVB films) and glued as a trilayer arrangement to the inner and outer pane 2, 3. The heatable, electrically conductive coating 8 is preferably applied by sputtering or magnetron cathodic sputtering onto the inner or outer pane 2, 3.

As shown in FIG. 1, the electrically conductive coating 8 is electrically conductively connected adjacent the first side 6, 6', i.e., on the upper and lower pane edge 5, to a strip-shaped upper collection electrode or busbar 11 and to a strip-shaped lower collection electrode 11'. The upper collection electrode 11 and the lower collection electrode 11' are provided for connecting to, in each case, one pole of a voltage source (not shown). The two collection electrodes 11, 11' of opposite polarity serve for uniform introduction and distribution of the heating current into the heating field 12 of the heatable coating 8 situated between them. The two collection electrodes 11, 11' are, for example, printed onto the electrically conductive coating 8 and have, in each case, an at least approximately rectilinear course.

The collection electrodes 11, 11' can also, however, be subdivided, in each case, into two subregions spatially separated from one another.

The upper collection electrode 11 in the installed state of the windshield 1 separates the heating field 12 from the subregion 8''' of the electrically conductive coating 8 running along the upper first side 6 of the pane edge 5.

The lower collection electrode 11' in the installed state of the windshield 1 separates the heating field 12 from the subregion 8' running along the lower first side 6'. This subregion 8' serves for the heating of the wiper parking zone. Further details of various embodiments according to the invention emerge from details A of the FIGS. 5 to 9.

Below the upper collection electrode 11, three coating-free communication windows are arranged in the heating field 12 centrally as a mirror image. In other words, they are divided in half by the imaginary vertical centerline M or axis of symmetry.

Two power supply lines 15, 15' arranged as a mirror image relative to one another run from the two ends of the upper collection electrode 11 in the subregions 8'' of the coating 8 along the respective associated subregion of the coating edge to the additional electrodes 18, 18' opposite one another in the subregion 8'. The power supply lines 15, 15' and the additional electrodes 18, 18' are made of the same material as the collection electrodes 11, 11'.

The power supply lines 15, 15' and the additional electrodes 18, 18' are electrically decoupled by the coating-free lines 16, 16' associated in each case therewith, running along the power supply lines 15, 15' on the side of the heating field 12 from the heating field 12. The coating-free lines 16, 16' have a width of 100 μm. They are preferably producible by laser ablation.

The coating-free lines 16, 16' run all the way to the upper collection electrode 11 and continue above the upper collection electrode 11 all the way to the peripheral edge strip 9 and separate the subregions 8'' running along the second sides 7, 7' from the subregion 8''' running along the upper first side 6 from one another. Further details emerge from the detail B of FIG. 4.

FIG. 4 depicts the intersection 17 of the coating-free line 16 with the upper collection electrode 11. Preferably, this intersection 17 is producible by printing, by screen printing, the upper collection electrode 11 over the coating-free line 16 previously produced by laser ablation.

FIG. 4 further depicts the preferred configuration of the black masking strip 13 as it is also use in the region of the lower collection electrode 11' and the regions 8", 15, 16. The masking strip 13 conceals the functional elements in these regions and also protects them against UV radiation, which can damage the functional elements. Specifically, the black masking strip 13 comprises a visually concealing, opaque subregion 13', which transitions on its edge 13" into the visually partially transparent subregion 13''', which itself reaches to the edge 13''''. The visually partially transparent subregion 13''' is, for example, a dot grid. Preferably, the masking strip 13 is applied to the inside, i.e., the side of the outer pane 2 turned toward the inner pane 3, by screen printing and fired prior to assembly, before the two panes 2 and 3 are bonded with the adhesive layer 4.

Figure 5:
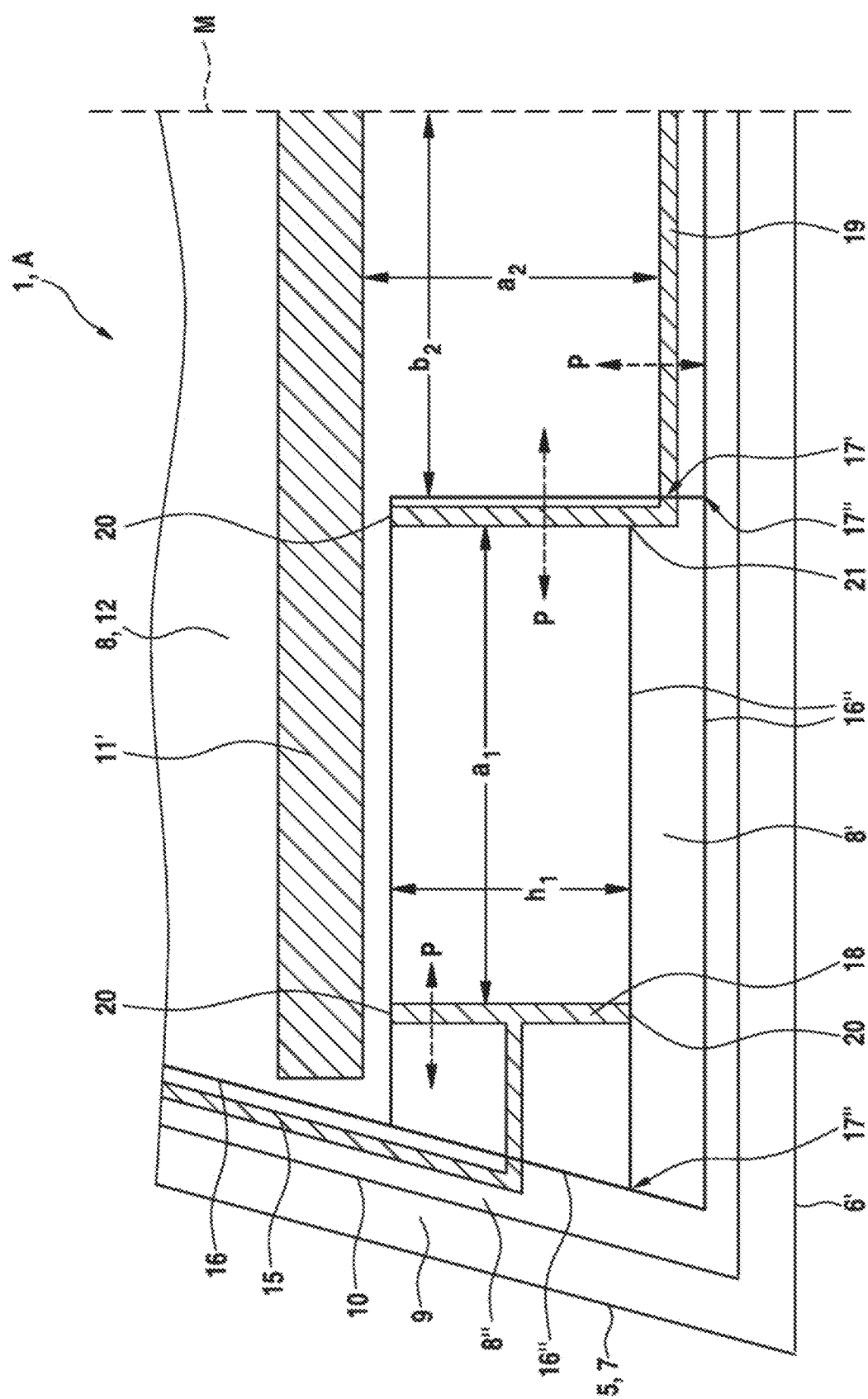
FIG. 5 a plan view of the detail A from an exemplary embodiment of the windshield 1 according to the invention of FIG. 1.

FIG. 5 in Conjunction with FIG. 1

FIG. 5 depicts a plan view of the detail A from an exemplary embodiment of the windshield 1 of FIG. 1.

The detail A portrays only the left subregion of the coating 8' in the region of the wiper parking zone all the way to the centerline and axis of symmetry M. The right subregion of the coating 8' is a mirror image of the left subregion 8' and, consequently, is not portrayed.

In this exemplary embodiment of FIG. 5, the coating-free line 16 transitions into the system 16" of three horizontal coating-free lines and one vertical coating-free line of a line width of 30 μm. In this system 16", three horizontal coating-free lines arranged parallel to one another branch in the left subregion 8' at three branching points 17". The upper coating-free line touches the upper ends 20 of the vertically arranged additional electrode 18 and of the vertically arranged leg of the counter electrode/connection conductor 19. The central coating-free line touches the lower end 20 of the additional electrode and ends at its endpoint 21 on the vertically arranged leg of the counter electrode/connection conductor 19. The lower coating-free line runs from its branching point 17" out parallel to the lower peripheral coating edge 10 along the lower first side 6' on the way to the imaginary centerline M and beyond.

The upper coating-free line runs after the upper end 20 of the vertical leg of the counter electrode/connection conductor 19 vertically downward and crosses the horizontal leg of the counter electrode/connection conductor 19 in the intersection 17' and continues below the horizontal leg all the way to the branching point 17" of the lower coating-free line.

Figure 6:
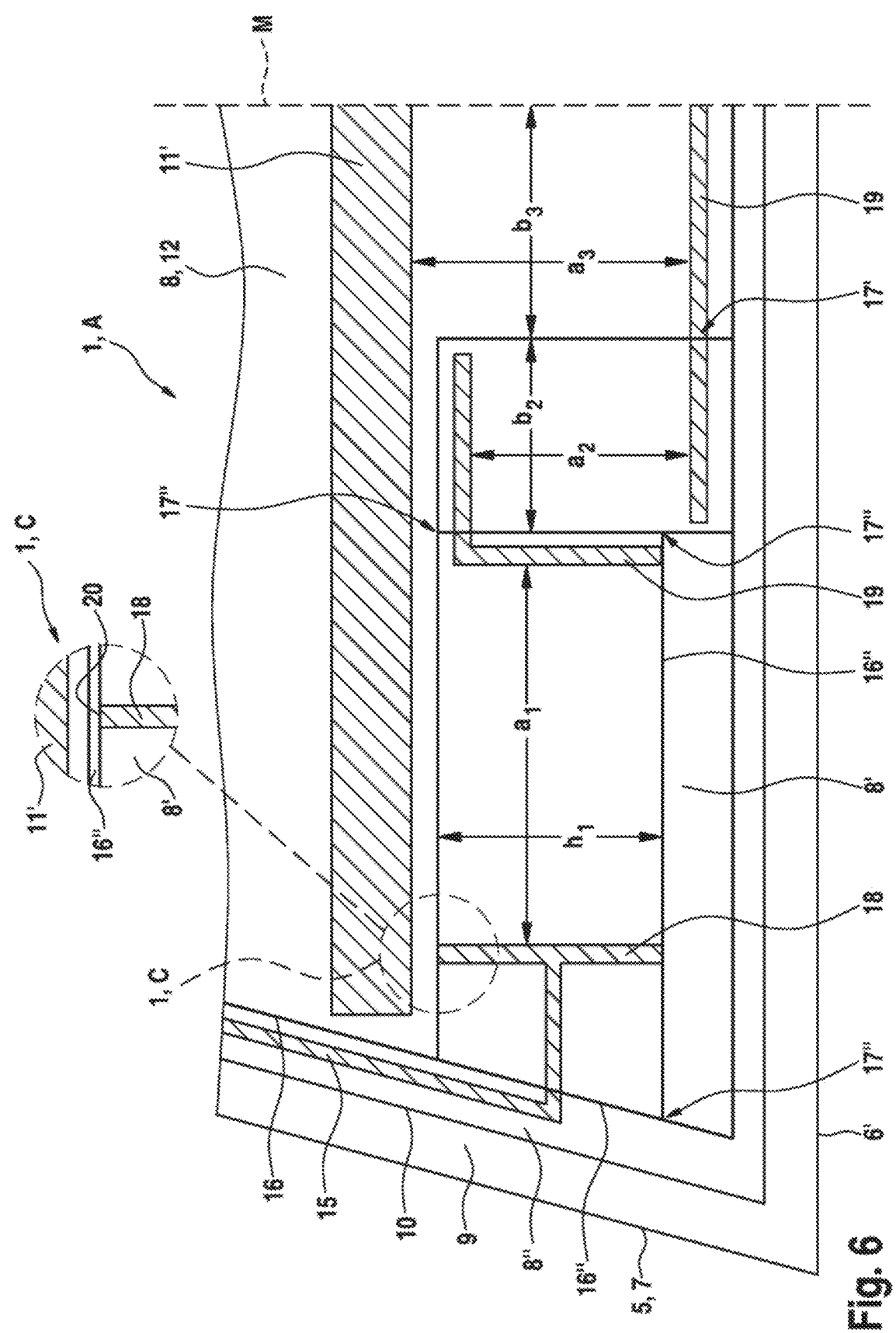
FIG. 6 a plan view of the detail A from another exemplary embodiment of the windshield 1 according to the invention of FIG. 1, together with the enlarged detail C.

Details of the endpoints 20 are apparent from the enlarged detail C in FIG. 6. Details of the branching points 17" are apparent from the enlarged detail D of FIG. 7.

Two current paths $a_1$ and $a_2$ are formed in the subregion 8' by this system 16" of four coating-free lines. The current path $a_1$ runs from the additional electrode 18 to the vertical leg of the counter electrode/connection conductor 19; it is thus, in this embodiment and in the subsequently described embodiments, the first current path. From the horizontal leg of the counter electrode/connection conductor 19, the current path $a_2$ runs all the way to the lower collection electrode 11'. The relationship $VH_1=0.9$ wir and n=2. Upon application of a supply voltage of 12 V, the heating current flows in the system 16" from the additional electrode 18 via the counter electrode/connection conductor 19 to the lower collection electrode 11'.

It is a very particular advantage of the system 16", 18, 19 according to the invention that by means of it the coating 8' is heated uniformly, the specific heating power being at 400 to 550 W/m². Another very particular advantage of the system 16", 18, 19 according to the invention is, furthermore, that the entire configuration can be adapted by a simple parallel shift P, for example, of the additional electrode 18 and/or of the vertical leg of the counter electrode/connection conductor 19 to the requirements of the individual case without the specific heating power being disadvantageously altered—for example, by the occurrence of hot spots and/or cold spots. The optimum configuration of the electrodes 18, 19 and of the current paths $a_1 \ldots a_n$ can be determined in a simple manner for the individual case using customary, known simulation programs.

Overall, even at particularly low temperatures <0° C., the embodiment of the transparent pane according to the invention 1 of FIG. 5 effectively prevents the windshield wipers from freezing in the wiper parking zone.

FIG. 6 in Conjunction with FIG. 1

FIG. 6 depicts a plan view of the detail A from an exemplary embodiment of the windshield 1 of FIG. 1.

As in FIG. 5, the detail A portrays only the left subregion of the coating 8' in the region of the wiper parking zone all the way to the centerline and axis of symmetry M. Here again, the right subregion of the coating 8' is a mirror image of the left subregion 8' and, consequently, does not need to be portrayed.

In this exemplary embodiment of FIG. 6, the coating-free line 16 transitions into the system 16" of a total of three horizontal and two vertical coating-free lines of a line width of 30 μm. In this system 16", three horizontal coating-free lines arranged parallel to one another branch, in the left subregion 8', at the three branching points 17". The upper coating-free line touches the upper and of the additional electrode 18. For details, reference is made to the enlarged detail C of FIG. 6. Then, the coating-free line runs along the horizontal leg of the two-part counter electrode/connection conductor 19. In this region, a vertical coating line branches (branching point 17"), which line runs all the way to the lower horizontal coating-free line. The center horizontal coating-free line of the system 16" touches the lower ends of the vertical additional electrode 18 and of the vertical leg of the two-part counter electrode/connection conductor 19 and runs all the way to the branching point 17" with the coating-free line arranged along the vertical leg of the counter electrode/connection conductor 19. Details concerning the branching points 17" are apparent from the detail D of FIG. 7.

In the region of the end of the horizontal leg of the two-part counter electrode/connection conductor 19, the coating-free line runs vertically downward and crosses a subregion of the counter electrode/connection conductor 19 spatially separated therefrom but electrically coupled to the horizontal leg. The intersection 17' has the same configuration as the intersection 17 in FIG. 4. The subregion of the counter electrode/connection conductor 19 is then electrically coupled to the lower collection electrode 11', namely, via the electrically conductive coating.

Three current paths $a_1$, $a_2$, and $a_3$ are formed by this system 16" of five coating-free lines. The current path $a_1$ runs from the additional electrode 18 to the vertical leg of the two-part counter electrode/connection conductor 19. The current path $a_2$ runs from the horizontal leg of the counter electrode/connection conductor 19 all the way to the separate horizontal subregion of the counter electrode/connection conductor 19. The current path $a_3$ runs from the separate horizontal subregion of 19 to the lower collection electrode 11'.

The additional electrode 18 is directly connected to the first collection rail 11 via the power supply line 15. In contrast thereto, the counter electrode 19 is not directly connected to the second collection rail 11'. The counter electrode 19 is a connection conductor that connects to one another two coating segments that are formed by the coating-free lines such that a current can flow between the coating segments.

The current flow of all current paths $a_1$-$a_n$ is driven by the difference in potential between the additional electrode 18 (connected to the first collection rail 11) and the second collection rail 11'. The segmentation of the conductive coating formed by the coating-free lines as well as the connection of the segments by means of the counter electrode(s) 19 serve to direct the current flow in the form of the current paths $a_1$-$a_n$.

The relationship $VH_1=1$, the relationship $VH_2=1$, and n=2 and 3. Upon application of a supply voltage of 12 V, the heating current flows in the system 16" from the additional electrode 18 via the counter electrode/connection conductor 19 to the lower collection electrode 11'. Upon application of a supply voltage of 12 V, the current flows in the system 16" from the additional electrode 18 via the two-part counter electrode/connection conductor 19 to the lower collection electrode 11'.

It is a very particular advantage of this system 16", 18, 19 according to the invention as well that by this means the coating 8' is heated uniformly, with the specific heating power at 400 to 550 W/m². Another very particular advantage of the system 16", 18, 19 according to the invention is, furthermore, that the entire configuration can be adapted, by a simple parallel shift P, for example, of the additional electrode 18 and/or of the vertical leg of the counter electrode/connection conductor 19, to the requirements of the individual case without the specific heating power adversely changing—for example, through the occurrence of hot spots and/or cold spots. The optimum configuration of the electrodes 18, 19 and of the current paths $a_1 \ldots a_n$ for the individual case can be determined in a simple manner using customary, known simulation programs.

Overall, the embodiment of the transparent pane 1 according to the invention of FIG. 6 effectively prevents the windshield wipers from freezing in the wiper parking zone even with particularly low temperatures of <0° C.

Figure 7:
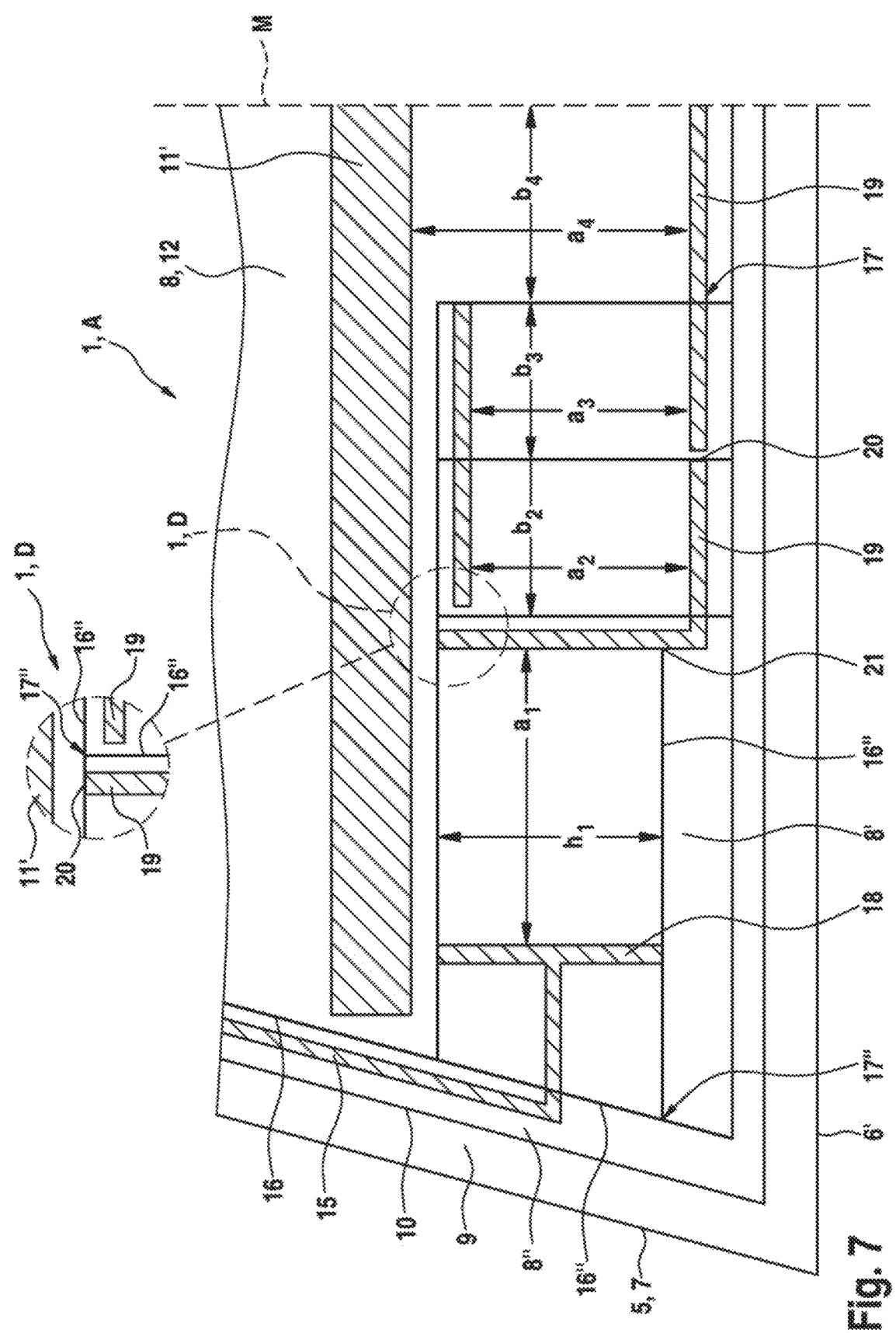
FIG. 7 a plan view of the detail A from yet another exemplary embodiment of the windshield 1 according to the invention of FIG. 1, together with the enlarged detail D.

FIG. 7 in Conjunction with FIG. 1

FIG. 7 depicts a plan view of the detail A from an exemplary embodiment of the windshield 1 of FIG. 1.

As in FIGS. 5 and 6, the detail A portrays only the left subregion of the coating 8' in the region of the wiper parking zone all the way to the centerline and axis of symmetry M. Here again, the right subregion of the coating 8' is a mirror image of the left subregion 8' and, consequently, does not need to be portrayed.

In this exemplary embodiment of FIG. 7, the coating-free line 16 transitions into the system 16" of a total of three horizontal and three vertical coating-free lines of a line width of 30 μm. In this system 16", three horizontal coating-free lines arranged parallel to one another branch, in the left subregion 8', at the three branching points 17". Of these, the upper coating-free line touches the upper end of the vertical additional electrode 18 and the upper end of the vertical leg of the three-part additional electrode 19. Thereafter, the upper coating-free line runs along the spatially separate upper subregion of the three-part counter electrode/connection conductor 19. The upper subregion is coupled to the lower horizontal leg of the three-part counter electrode and its third spatially separate lower subregion.

After the endpoint 20, there is a branching 17" where one coating-free line branches vertically downward and runs along the vertical leg of the two three-part counter electrodes/connection conductors 19 (for details, cf. the enlarged detail D of FIG. 7), intersects the lower horizontal leg and ends at the lower horizontal coating-free line. In the further course, the upper horizontal coating-free line branches once more, whereupon the branched coating-free line runs vertically downward, touches the endpoint 20 of the horizontal lower leg, runs further through the gap between the end of the horizontal lower leg and the third horizontal subregion of the three-part counter electrode/connection conductor 19, and, after that, coincides with the lower horizontal coating-free line.

The upper coating-free line runs along the horizontal upper subregion of the counter electrode/connection conductor 19 and, after that, bends vertically downward, touches the end of the horizontal upper subregion, intersects at 17' the horizontal, lower, third subregion of the three-part counter electrode/connection conductor 19, and then also coincides with the lower horizontal coating-free line.

The horizontal, lower, third subregion of the three-part counter electrode/connection conductor 19 then runs further all the way to the centerline and axis of symmetry M.

Four current paths $a_1$, $a_2$, $a_3$, and $a_4$ are formed by this system 16" of six coating-free lines. The current path $a_1$ runs from the additional electrode 18 to the vertical leg of the three-part counter electrode/connection conductor 19. The current path $a_2$ runs from the horizontal lower leg of the counter electrode 19 all the way to the separate horizontal upper subregion of the counter electrode/connection conductor 19. The current path $a_3$ runs from this separate horizontal upper subregion of 19 to the horizontal lower subregion of the three-part counter electrode/connection conductor 19. From there out, the current path $a_4$ runs to the lower collection electrode 11'.

The relationship $VH_1=1.5$ and n=2 to 4. Upon application of a supply voltage of 12 V, the current flows in the system 16" from the additional electrode 18 via the three-part counter electrode 19 to the lower collection electrode 11'.

It is a very particular advantage of this system 16", 18, 19 according to the invention as well that by means of it, the coating 8' is heated uniformly, the specific heating power being at 400 to 550 W/m². Another very particular advantage of the system 16", 18, 19 is, furthermore, that the entire configuration can be adapted by simple parallel shifts P, for example, of the additional electrode 18 and/or of the vertical leg of the counter electrode/connection conductor 19 to the requirements of the individual case, without the specific heating power being disadvantageously altered—for example, by the occurrence of hot spots and/or cold spots. The configuration of the electrodes 18, 19 and of the current paths $a_1 \ldots a_n$ optimum for the individual case can be determined in a simple manner using customary, known simulation programs.

Overall, even at particularly low temperatures <0° C., the embodiment of the transparent pane 1 according to the invention of FIG. 7 effectively prevents the windshield wipers from freezing in the wiper parking zone.

Figure 8:
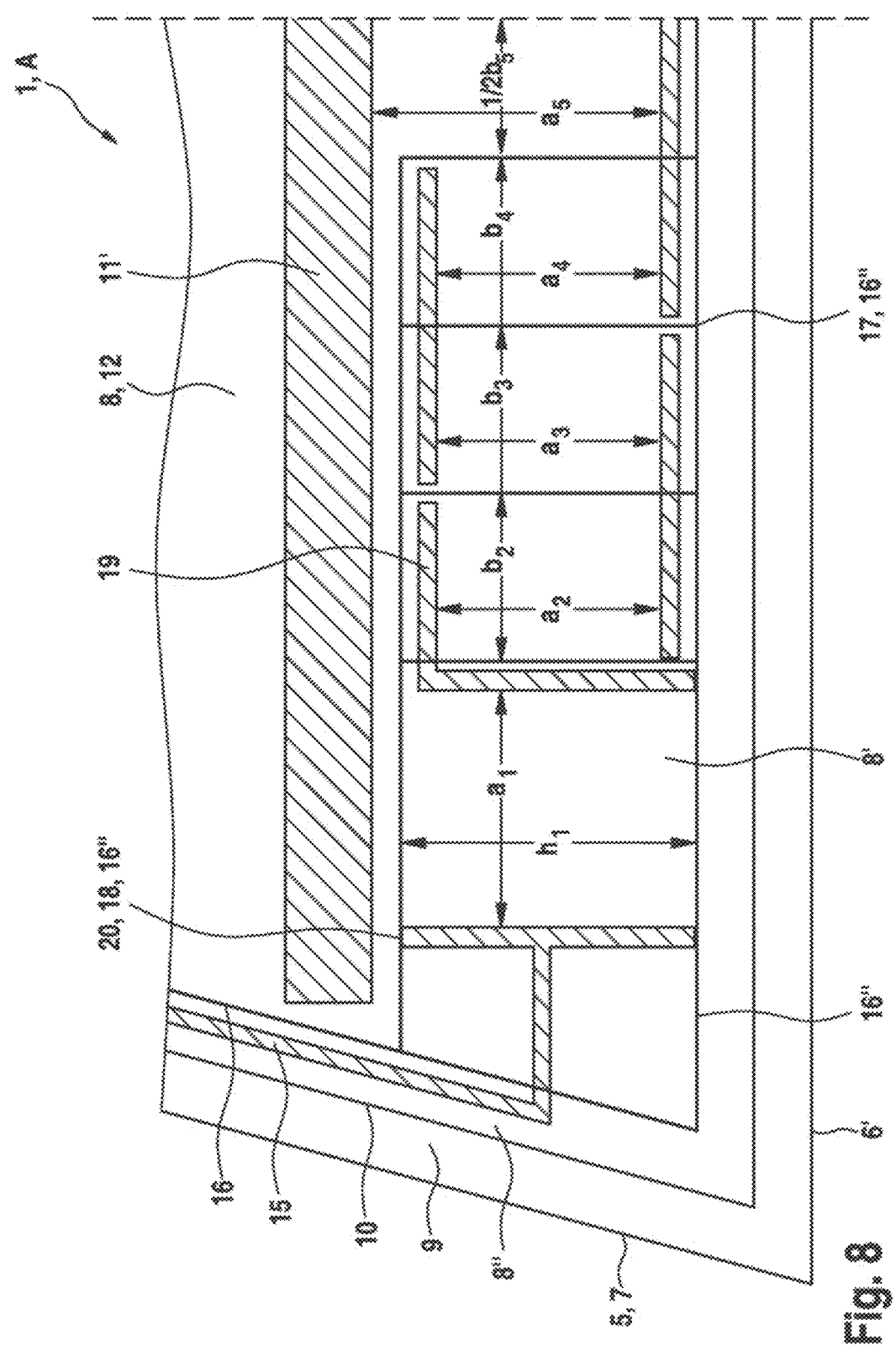
FIG. 8 a plan view of the detail from yet another exemplary embodiment of the windshield 1 according to the invention.

FIG. 8 in Conjunction with FIG. 1

FIG. 8 depicts a plan view of the detail A from an exemplary embodiment of the windshield 1 of FIG. 1.

As in FIGS. 5, 6, and 7, the detail A portrays only the left subregion of the coating 8' in the region of the wiper parking zone all the way to the centerline and axis of symmetry M.

Here again, the right subregion of the coating 8' is a mirror image of the left subregion 8' and, consequently, does not need to be portrayed.

The design of the windshield 1 of FIG. 8 is a further development of the design of the windshield 1 of FIG. 6. The difference resides in the fact that in the design of FIG. 8 the coating 8' in the region of the wiper parking zone is divided by two horizontal and ten vertical coating-free lines into ten current paths $a_1$-$a_{10}$ and not into three current paths $a_1$-$a_3$ by three horizontal and three vertical coating-free lines.

The relationship $VH_1=1.5$ and n=2 to 5. Upon application of a supply voltage of 12 V, the current flows in the system 16" from the additional electrode 18 via the four-part counter electrode/connection conductor 19 to the lower collection electrode 11'.

It is a very particular advantage of this system 16", 18, 19 according to the invention as well that by this means the coating 8' is heated especially uniformly, with the specific heating power at 500 to 700 to 0 W/m². Another very particular advantage of the system 16", 18, 19 according to the invention is that the entire configuration can be adapted, by simple parallel shifts P, for example, of the additional electrode 18 and/or of the vertical leg of the counter electrode/connection conductor 19, to the requirements of the individual case without the specific heating power adversely changing—for example, through the occurrence of hot spots and/or cold spots. The optimum configuration of the electrodes 18, 19 and of the current paths $a_1 \ldots a_n$ for the individual case can be determined in a simple manner using customary, known simulation programs.

Overall, the embodiment of the transparent pane 1 according to the invention of FIG. 7 effectively prevents the windshield wipers from freezing in the wiper parking zone, even with particularly low temperatures of <0° C.

In FIGS. 1 to 8, the reference characters have the following meaning:
1 windshield
2 outer pane
3 inner pane
4 adhesive layer
5 peripheral pane edge
6, upper first side of the pane edge 5 in the installed state of the windshield 1
6' lower first side of the pane edge 5 in the installed state of the windshield 1
7, 7' lateral second side of the pane edge 5 in the installed state of the windshield 1
7 electrically conductive coating
8' lower electrically conductive coating 8 arranged in the region of the wiper parking zone outside the heating field 12 along the lower first side 6' of the pane edge 5 in the installed state of the windshield 1
8" subregions of the electrically conductive coating 8 arranged outside the heating field 12 along the second sides 7 and 7' of the pane edge 5 in the installed state of the windshield 1
8'" subregion of the electrically conductive coating 8 arranged outside the heating field 12 along the upper first side 6 of the pane edge 5 in the installed state of the windshield 1
9 peripheral edge strip free of the electrically conductive coating 8
10 peripheral coating edge
11, upper collection electrode in the installed state of the windshield 1
11' lower collection electrode in the installed state of the windshield 1
12 heating field
13 masking strip
13' visually concealing, opaque subregion of the masking strip 13
13" edge of the visually concealing, opaque subregion of the masking strip 13
13'" visually partially transparent subregion of the masking strip 13
13"" edge of the visually partially transparent subregion of the masking strip 13
14 communication window free of the electrically conductive coating 8
15, 15' power supply lines running from the upper collection electrode 11 along the respective associated coating edge 10 in the respective associated subregions 8" to the additional electrodes 18, 18'
16, 16' coating-free line running along the power supply lines 15, 15' on the side of the heating field 12
16" system of at least four coating-free lines in the coating 8' in the region of the wiper parking zone
17 intersection of the coating-free lines 16, 16' with the collection electrode 11
17' intersection of a coating-free line 16" with a counter electrode 19
17" branching point of a coating-free line 16"
18, 18' additional electrodes electrically connected to the collection electrode 11 via power supply lines 15, 15' arranged in the lower electrically conductive coating 8' (wiper parking zone)
19 counter electrode to the additional electrode 18 (connection conductor)
20 endpoint of an additional electrode 18 or a counter electrode 19 on a coating-free line 16"
21 endpoint of a coating-free line 16" on an additional electrode 18 or a counter electrode 19
$a_1$ length of the current path from the additional electrode 18 to the nearest opposing section of the counter electrode 19
$a_2, \ldots, a_n$ length of a current path
$h_1$ height of the current path $a_1$
$b_2, \ldots b_n$ width of the current paths $a_2$ to $a_n$
½$b_6$ one half of the width $b_6$
A enlarged detail of the windshield 1
B enlarged detail of the windshield 1
C enlarged detail of the windshield 1
D enlarged detail of the windshield 1
M vertical centerline and axis of symmetry
P parallel shift

The invention claimed is:
1. A transparent pane comprising:
  i) at least one heatable, electrically conductive coating connected to at least two collection electrodes adapted for electrical connection to two poles of a voltage source so that upon application of a supply voltage, a heating current flows via a heating field formed between the at least two collection electrodes, wherein:
    ia) the heating field has at least one communication window free of the heatable, electrically conductive coating, and
    ib) the heatable, electrically conductive coating is bounded by a peripheral coating edge, and a peripheral edge strip that is free of the electrically conductive coating and extends all the way to a peripheral pane edge of the transparent pane,
  ii) two first sides including a top side and a bottom side, and two second sides including a left side and a right side, iii) at least one heatable, electrically conductive coating arranged outside the heating field and spatially separated from the heating field by a collection electrode of the at least two collection electrodes that runs along a first side of the pane edge; and
iv) at least one additional electrode arranged in a region of each of the two second sides of the pane edge, each connected to a first collection electrode of the at least two collection electrodes via at least one power supply line that runs along the peripheral coating edge and along a respective one of the two second sides of the pane edge through one or more of:
    iva) a section of the peripheral edge strip,
    ivb) a section of the peripheral coating edge that is electrically decoupled from the heating field by a respective at least one associated coating free line, and
    ivc) a section of the heatable, electrically conductive coating arranged outside the heating field that is electrically decoupled from the heating field by a respective at least one associated coating free line;

wherein the heatable electrically conductive coating arranged outside the heating field comprises:
A) at least one connection conductor electrically associated with each of the at least one additional electrode, and electrically connected to a second collection electrode of the at least two collection electrodes via the heatable, electrically conductive coating, the second collection electrode having an opposite polarity from a polarity of the first collection electrode, and
B) at least two systems of coating-free lines, each comprising at least four coating-free lines, positioned opposite one another as a mirror image relative to a vertical centerline and axis of symmetry of the transparent pane that are configured to direct the heating current, flowing upon application of a supply voltage, from each of the at least one additional electrode to the second collection electrode of opposite polarity via:
    B1) at least two current paths comprising a current path $a_1$ and remaining current paths $a_2$ to $a_n$, formed in regions of the heatable, electrically conductive coating arranged outside the heating field, and
    B2) the at least one connection conductor, wherein lengths of the current paths satisfy a mathematical relationship VH1:

$$VH_1 = h_1/b_n = 0.5 \text{ to } 2.0,$$

where n represents an integer number from 2 to 30,
$a_1$ designates the current path from the at least one additional electrode to a nearest opposing section of the at least one connection conductor,
$h_1$ represents a height of the current path $a_1$ delimited by two coating-free lines of the at least four coating-free lines,
$a_2$ to $a_n$ designate the remaining current paths from at least one connection conductor to a nearest section of another connection conductor or from the other connection conductor to the second collection electrode,
$b_n$ represents a width of a current path $a_n$, and
$VH_1$ represents a ratio of the height of the current path $a_1$ to the width of the current path $a_n$.

2. The transparent pane according to claim 1, wherein each of the at least one additional electrode, the at least one connection conductor associated therewith, the systems of coating-free lines, and the current paths $a_1$ and $a_2$ to $a_n$, are arranged as a mirror image relative to the vertical centerline and axis of symmetry of the transparent pane.

3. The transparent pane according to claim 1, wherein $VH_1 = 0.75$ to 1.5.

4. The transparent pane according to claim 1, wherein $VH_1 = 0.8$ to 1.2.

5. The transparent pane according to claim 1, wherein at least one of the at least four coating-free lines runs, at least in sections, in one or more of: a) rectilinearly, b) wave-shaped, c) meander-shaped, d) sawtooth-shaped, and e) zigzag-shaped.

6. The transparent pane according to claim 1, wherein at least one of the at least four coating-free lines runs, at least in sections, in one or more of: a) continuously, and b) as a broken line of discrete cuts.

7. The transparent pane according to claim 1, wherein at least one of the at least four coating-free lines is produced by laser ablation of the heatable, electrically conductive coating of the heating field, of the electrically conductive coating, or of both of the electrically conductive coating of the heating field and the electrically conductive coating.

8. The transparent pane according to claim 1, wherein in the installed state of the transparent pane, the heatable, electrically conductive coating arranged outside the heating field is arranged along the bottom side of the pane edge.

9. The transparent pane according to claim 1, wherein in the installed state of the transparent pane, the heatable, electrically conductive coating arranged outside the heating field is arranged along the top side of the pane edge.

10. The transparent pane according to claim 8, wherein the heatable, electrically conductive coating arranged outside the heating field is arranged in a region of a lower or of an upper wiper parking zone.

11. The transparent pane according to claim 1, wherein the at least four horizontal coating-free lines have each a width of 10 pm to 1 mm.

12. The transparent pane according to claim 1, wherein at least one of the at least two collection electrodes is divided into at least two subregions spatially separated from one another.

13. A method for producing the transparent pane according to claim 1, the method comprising the following process steps:
(A) producing the heatable, electrically conductive coating;
(B) producing the at least one coating-free communication window in the heatable, electrically conductive coating of the heating field, said heating field being formed between the at least two collection electrodes;
(C) forming:
    (c1) the at least two collection electrodes for connection to the two poles of the voltage source, the at least two collection electrodes being electrically connected to the heatable, electrically conductive coating so that by application of the supply voltage, the heating current flows via the heating field, and/or
    (c2) the at least two collection electrodes for connection to the two poles of the voltage source, the at least two collection electrodes being electrically connected to the heatable, electrically conductive coating, wherein at least one of the at least two collection electrodes is divided into at least two subregions spatially separated from one another;
(D) producing:
    (d1) in the region of each of the two second sides of the pane edge, the at least two additional electrodes opposite one another as a mirror image relative to the vertical centerline and axis of symmetry of the transparent pane;

(d2) at least two connection conductors as a mirror image opposite one another relative to the vertical centerline and axis of symmetry of the transparent pane and electrically associated with the additional electrodes, said connection conductors being electrically connected, upon application of the supply voltage, to the collection electrode of opposite polarity via the heatable, electrically conductive coating; and (d3) at least two power supply lines arranged as a mirror image of each other relative to the vertical centerline and axis of symmetry of the transparent pane, each of said power supply lines respectively connecting at least one of the additional electrodes to at least one collection electrode or subregion thereof, and running along the coating edge and along a respective one of the two second sides of the pane edge, through one or more of:

the section of the peripheral edge strip, the section of the peripheral coating edge that is electrically decoupled from the heating field by a respective at least one associated coating-free line, and the section of the heatable, electrically conductive coating arranged outside the heating field that is electrically decoupled from the heating field by a respective at least one associated coating-free line;

(E) forming:

(e1) at least two coating-free lines running along the power supply lines on the side of the heating field;

(e2) the at least two systems of coating-free lines positioned opposite one another as a mirror image, each comprising at least four coating-free lines that are arranged so that, upon application of the supply voltage, the heating current flows directly from a respective one of the at least one additional electrode to the second collection electrode of opposite polarity via:

at least the two current paths comprising the current path $a_1$ and remaining current paths $a_2$ to $a_n$, and the at least one connection conductor, wherein the lengths of the current paths satisfy the mathematical relationship $VH_1$:

$$VH_1 = h_1/b_n = 0.5 \text{ to } 2.0$$

where n represents an integer number from 2 to 30, ($a_1$) designates the current path from the at least one additional electrode to the nearest opposing section of the at least one connection conductor, ($h_1$) represents the height of the current path $a_1$ delimited by two coating-free lines of the at least four coating-free lines ($a_2$ to $a_n$) designate the remaining current paths from at least one connection conductor to the nearest section of another connection conductor or from the other connection conductor to the second collection electrode, and bn represents the width of the current path $a_n$, $VH_1$ represents the ratio of the height of the current path $a_1$ to the width of the current path $a_n$, wherein the process steps (B) and (E) are performed one after the other or simultaneously, and wherein the process steps (C) and (D) are performed simultaneously or one after the other as well as before or after the process steps (B) and (E).

14. The method according to claim 13, wherein $VH_1 = 0.75$ to 1.5.

15. The method according to claim 14, wherein: the at least two coating-free lines and the at least two systems of coating-free lines are produced by laser ablation of the heatable, electrically conductive coating inside and outside the heating field, and the process steps (C) and (D) are performed using screen printing.

16. A method, comprising using of the transparent pane produced in accordance with the method of claim 13 as a functional, or decorative, or both functional and decorative single piece and as an assembly part in furniture, appliances, buildings, and means of transportation.

* * * * *